(12) United States Patent
Wei et al.

(10) Patent No.: US 7,414,928 B2
(45) Date of Patent: Aug. 19, 2008

(54) METHOD FOR DETERMINING SUB-BEAM ADD SIGNAL (SBAD) VALUE

(75) Inventors: Tao-Yen Wei, Taipei (TW); Yi-Chuan Pan, Taipei (TW)

(73) Assignee: Lite-On It Corporation, Taipei (TW)

( * ) Notice: Subject to any disclaimer, the term of this patent is extended or adjusted under 35 U.S.C. 154(b) by 641 days.

(21) Appl. No.: 11/175,760

(22) Filed: Jul. 7, 2005

(65) Prior Publication Data
US 2006/0007813 A1 Jan. 12, 2006

(30) Foreign Application Priority Data
Jul. 8, 2004 (TW) .............................. 93120497 A

(51) Int. Cl.
*G11B 7/00* (2006.01)
(52) U.S. Cl. ............... 369/44.29; 369/47.25; 369/124.1
(58) Field of Classification Search ............... 369/124.1, 369/47.25, 44.29, 44.32, 44.31, 44.36, 53.15, 369/124.12
See application file for complete search history.

(56) References Cited
U.S. PATENT DOCUMENTS 5,247,509 A * 9/1993 Nakane et al. ............... 369/116
5,473,550 A * 12/1995 Cameron et al. ............. 702/94

* cited by examiner

*Primary Examiner*—Nabil Z Hindi
(74) *Attorney, Agent, or Firm*—Bacon & Thomas, PLLC.

(57) ABSTRACT

A method for determining a sub-beam add signal (SBAD) value is provided. At first, a $j^{th}$ read SBAD value is obtained at the $j^{th}$ read status. Next, the $j^{th}$ write SBAD value is determined according to the $(j-1)^{th}$ write SBAD gain at the $j^{th}$ write status. Then, the $j^{th}$ SBAD multiple is obtained according to the $j^{th}$ write SBAD value and the $j^{th}$ read SBAD value. Next, the $(j-1)^{th}$ write SBAD gain is changed into the $j^{th}$ write SBAD gain according to the $j^{th}$ SBAD multiple. At last, the level of the $(j+1)^{th}$ write SBAD value is adjusted according to the $j^{th}$ write SBAD gain at the $(j+1)^{th}$ write status.

12 Claims, 7 Drawing Sheets

METHOD FOR DETERMINING SUB-BEAM ADD SIGNAL (SBAD) VALUE

This application claims the benefit of Taiwan application Serial No. 93120497, filed Jul. 8, 2004, the subject matter of which is incorporated herein by reference.

BACKGROUND OF THE INVENTION

1. Field of the Invention

The invention relates in general to a method for generating a sub-beam add signal (SBAD) value, and more particularly to a method for reducing the difference between the read SBAD value and the write SBAD value.

2. Description of the Related Art

Living in modern times when science and technology advance rapidly and the applications of pictures, music, movies and computer software are gaining a greater popularity, high capacity disc such as CD, CD-R, CD-RW, DVD, DVD-R and DVD-RW have become an important software carriage to modern people in their everyday lives. Besides, the optical disc drives for reading/writing the optical disc are therefore become an essential peripheral of a personal computer.

As shown in FIG. 1A, a partial diagram showing the status after a conventional disc is formatted is shown. In the conventional method of formatting a disc 70, the optical disc drive would format the optical disc 70 as a lead-in region 71, a data packet write area 72 and a lead-out region 73, wherein the data packet write area 72 has a plurality of tracks for storing data with each and every of the tracks has a plurality of blocks disposed thereon. However, when parts of the tracks on the data packet write area 72 have defects such as scratches or fingerprints, the optical disc drive is unable to detect any defects on the optical disc 70 according to the above formatting method. It is very likely that the optical disc drive would have data written on defective blocks, causing incomplete data writing and largely affecting the quality of data writing.

To avoid the data being written on defective tracks, a "Mount Rainier" disc formatting method is provided. When the optical disc drive formats a disc according to the Mount Rainier method, the optical disc drive would first of all detect whether any defects exist on the optical disc. During the detecting process, the optical pick-up head of the optical disc drive would emit a Laser light having three or five beams onto the optical disc. Take the five-beam Laser light for example, the five beams comprise a main-beam and four sub-beams, wherein two sub-beams and another two sub-beams are symmetrically positioned at the two sides of the main-beam. The five beams are emitted onto the optical disc and form a corresponding main-spot and four corresponding sub-spots thereon. The optical pick-up head receives and senses the reflected beams of the four sub-beams reflected from the optical disc to generate a corresponding sub-beam add signal (SBAD).

As shown in FIGS. 1B-1C, the optical disc drive has a defect threshold range, whose range is −200 mV~400 mV for instance, and whether the spot at which the Laser light is emitted has defects or not is determined according to the comparison between the defect threshold range and the wave pattern of the SBAD. When the optical disc has defects such as scratches or fingerprints, the optical disc drive would generate a downward-projected SBAD 75 or an upward-projected SBAD 76, wherein each and every spot of the downward-projected SBAD 75 or the upward-projected SBAD 76 corresponds to an SBAD value. In FIG. 1B, the downward-projected SBAD 75 has a lowest point A, corresponding to a minimum SBAD value, wherein the minimum SBAD value is smaller than −200 mV. In FIG. 1C, the upward-projected SBAD 76 has a highest point B, corresponding to a maximum SBAD value, wherein the maximum SBAD value is larger than the 400 mV. Therefore, the optical disc drive would determine whether the SBAD value falls within the defect threshold range so as to conclude whether the spot at which the Laser light is emitted has defects or not. The block with a defect is regarded as a bad block.

As shown in FIG. 1D, after the optical disc drive complete defect detection of the optical disc 80, the optical disc drive would format the optical disc 80 as a lead-in region 81, a data packet write area 82, a data replacement area 83 and a lead-out region 84. The optical disc drive creates a main defect table 85 in the lead-in region 81, and further backups the main defect table 85 in the lead-out region 84 to record the address or the time domain of a bad block 86 on the optical disc 80. Unlike the conventional method which would have data written onto a bad block 86 with defects disposed thereon, the optical disc drive would not do the same. According to the main defect table 85, the optical disc drive would have data written onto the data replacement area 83 and records the data's writing position on the data replacement area 83. Consequently, the completeness and reliability of data can be maintained.

During the process of having data written onto the optical disc according to the Mount Rainier method, the optical disc drive adopts a sequential write method and divides the data into N data packets. The optical disc drive has the N data packets written onto the optical disc during the N read status and N write status with every read status followed by a write status. During the N read status, the optical disc drive uses a read laser power to read the optical disc, uses a stand-by status to perform focusing servo control and holding servo, and then waits for next data writing. During the N write status, the optical disc drive uses a write laser power to have the N data packets written onto the optical disc. After reading the optical disc at the i$^{th}$ read status, the optical disc drive is immediately switched to the i$^{th}$ write status from the i$^{th}$ read status and has the i$^{th}$ data packet written onto the optical disc, wherein i ranges from 1 to N. Such write method is also called "packet write method". Besides, when the optical disc drive is respectively at the read status and the write status, the optical pick-up head still receives the reflected beams of the four sub-beams reflected from the optical disc to generate a corresponding read SBAD signal and a corresponding write SBAD value.

As shown in FIG. 1E, when switched from a read status to a subsequent write status, the optical disc drive would vibrate under high speed rotation because the writing power of the laser light is higher than the reading power of the laser light, causing the SBAD level to upsurge at least 400 mV, resulting in a write SBAD value higher than the read SBAD value. For example, the write SBAD value and the read SBAD are respectively equal to 2.2 V and 1.7 V. When the optical disc drive compares the write SBAD value with the defect threshold range, the write SBAD value would fall outside the range of the defect threshold range, causing the optical disc drive to mis-determine that defects exist on the optical disc and result in an erroneous detection of defects. Therefore, the optical disc drive would have each and every of the data packets written onto data replacement area of the optical disc. Due to a small capacity, the data replacement area will soon be full loaded, causing write failure to occur.

SUMMARY OF THE INVENTION

According to the object of the invention, a method for determining a sub-beam add signal (SBAD) value is provided. The design of dynamically adjusting a write SBAD gain according to the difference between a write SBAD value and a read SBAD value effectively avoids an upsurge in the SBAD value when an optical disc drive is switched from a read status to a write status, thereby preventing errors in the detection of defects. Besides, the invention can have the design of an even narrower defect threshold range such as −50 mV~50 mV for instance to effectively detect fingerprints.

It is therefore an object of the invention to provide a method for determining an SBAD value applied in an optical disc drive when N data packets are written onto a disc during N read status and N write status. The N read status include a first to an $N^{th}$ read status, the N write status include a first to an $N^{th}$ write status, and the N data packets include a first to an $N^{th}$ data packet. The optical disc drive reads the optical disc at the $i^{th}$ read status and writes the $i^{th}$ data packet onto the optical disc at the $i^{th}$ write status, wherein i ranges from 1 to N. The optical disc drive has a predetermined write SBAD gain. The steps of the method are disclosed below. At first, the optical disc is read and a first read SBAD value is obtained at the first read status. Next, the first data packet is written onto the optical disc at the first write status and a first write SBAD value is obtained according to the predetermined write SBAD gain. Then, a first SBAD multiple is obtained according to the first write SBAD value and the first read SBAD value. Next, the predetermined write SBAD gain is changed into a first write SBAD gain according to the first SBAD multiple. Then, the optical disc is read at the $j^{th}$ read status and a $j^{th}$ read SBAD value is obtained, wherein j ranges from 2 to N−1. Next, the $j^{th}$ data packet is written onto the optical disc at the $j^{th}$ write status and a $j^{th}$ write SBAD value is determined according to the $(j−1)^{th}$ write SBAD gain. Then, a $j^{th}$ SBAD multiple is obtained according to the $j^{th}$ write SBAD value and the $j^{th}$ read SBAD value. Next, the $(j−1)^{th}$ write SBAD gain is changed into a $j^{th}$ write SBAD gain according to the $j^{th}$ SBAD multiple. Then, the optical disc is read at the $(j+1)^{th}$ read status and a $(j+1)^{th}$ read SBAD value is obtained. At last, the $(j+1)^{th}$ data packet is written onto the optical disc, at the $(j+1)^{th}$ write status and a $(j+1)^{th}$ write SBAD value is determined according to the $j^{th}$ write SBAD gain.

It is therefore another object of the invention to provide a method for determining a sub-beam add signal (SBAD) value applied in an optical disc drive. The optical disc drive adopts a sequential write method to dynamically adjust the SBAD level to avoid errors in detecting defects. In the method, firstly, a write SBAD value and a read SBAD value of the optical disc drive are calculated. Then, an SBAD gain is determined according to the write SBAD value and the read SBAD value. The SBAD gain is for calibrating the level of the next write SBAD value.

It is therefore other object of the invention to provide a method for determining a sub-beam add signal (SBAD) value applied in an optical disc writer when N data packets are written onto a disc during N read status and N write status. N read status include a first to an $N^{th}$ read status, N write status include a first to an $N^{th}$ write status, and N data packets include a first to an $N^{th}$ data packet. The optical disc drive reads the optical disc at the $i^{th}$ read status and has the $i^{th}$ data packet written onto the optical disc at the $i^{th}$ write status, wherein i ranges from 1 to N. The optical disc drive has a predetermined write SBAD gain. The steps of the method are disclosed below. At first, the optical disc is read and a first read SBAD value is obtained at the first read status. Then, the first data packet is written onto the optical disc at the first write status and a first write SBAD value is obtained according to predetermined write SBAD gain. Next, a first SBAD multiple is obtained according to the first write SBAD value and the first read SBAD value. Then, the predetermined write SBAD gain is changed into a first write SBAD gain according to the first SBAD multiple. Next, the optical disc is read at the $j^{th}$ read status and a $j^{th}$ read SBAD value is obtained, wherein j ranges from 2 to N. At last, the $j^{th}$ data packet is written onto the optical disc at the $j^{th}$ write status and a $j^{th}$ write SBAD value is determined according to the first write SBAD gain.

Other objects, features, and advantages of the invention will become apparent from the following detailed description of the preferred but non-limiting embodiments. The following description is made with reference to the accompanying drawings.

DETAILED DESCRIPTION OF THE INVENTION

First Embodiment

Figure 1A:
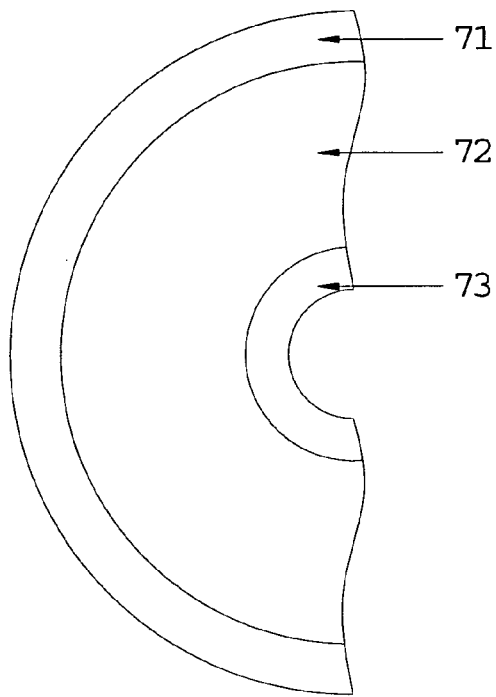
FIG. 1A (Prior Art) is a partial diagram showing the status after a conventional disc is formatted.
Figure 1B:
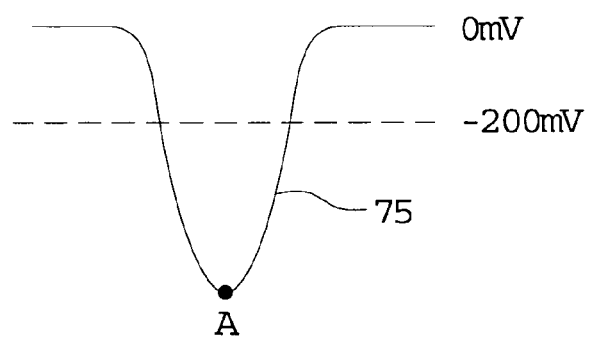
FIG. 1B (Prior Art) is a schematic diagram showing the comparison between a conventional defect threshold range and an SBAD signal of a defective disc.
Figure 1C:
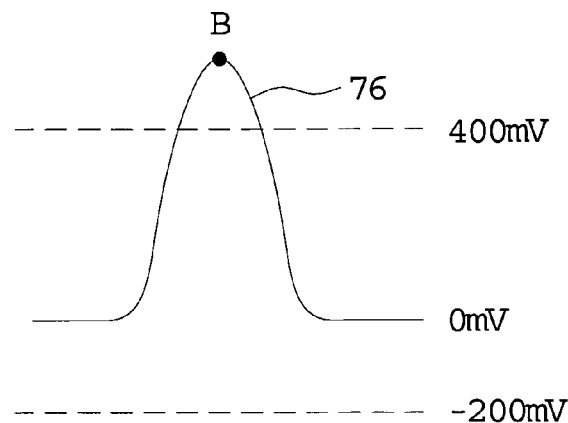
FIG. 1C (Prior Art) is a schematic diagram showing the comparison between a conventional defect threshold range and another SBAD signal of a defective disc.
Figure 1D:
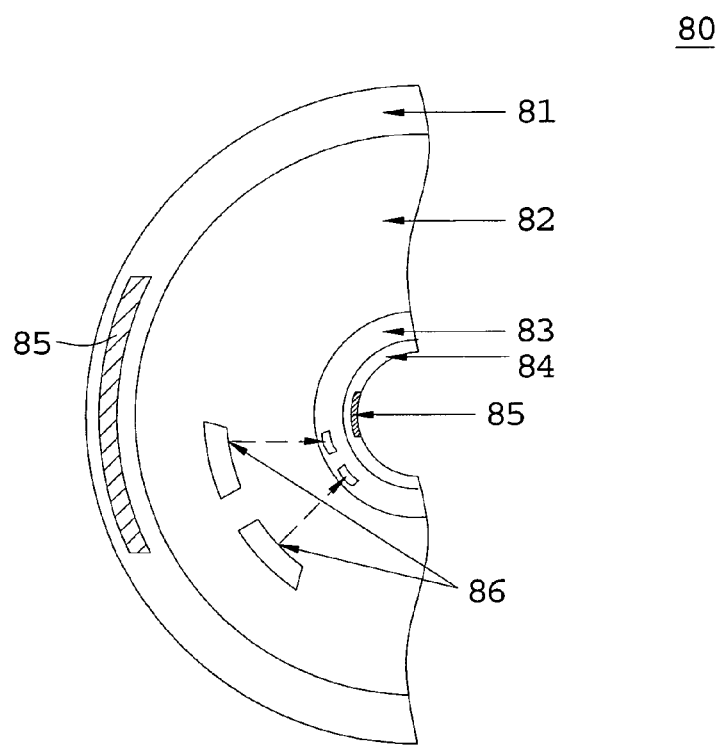
FIG. 1D (Prior Art) is a schematic diagram showing the status after a conventional disc is formatted by an optical disc writer using Mount Rainier method.
Figure 1E:
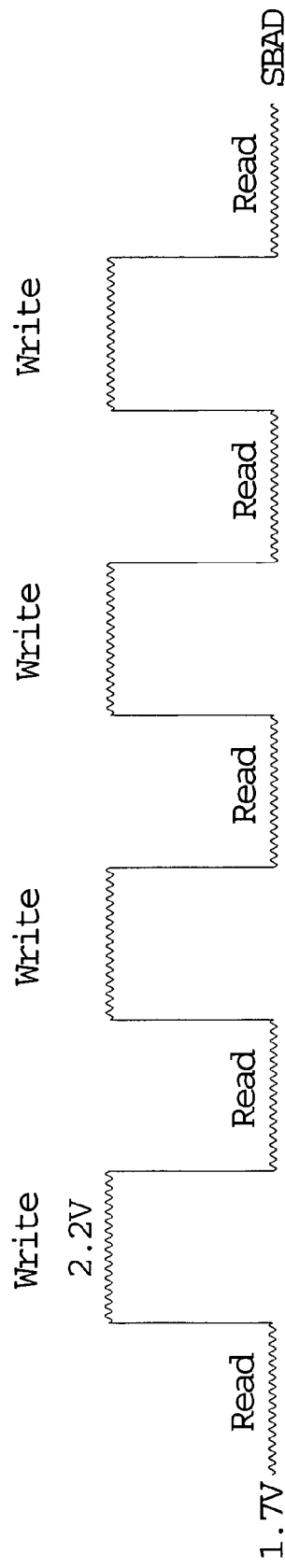
FIG. 1E (Prior Art) is a schematic diagram showing the comparison between a conventional write SBAD value and a read SBAD value.
Figure 2A:
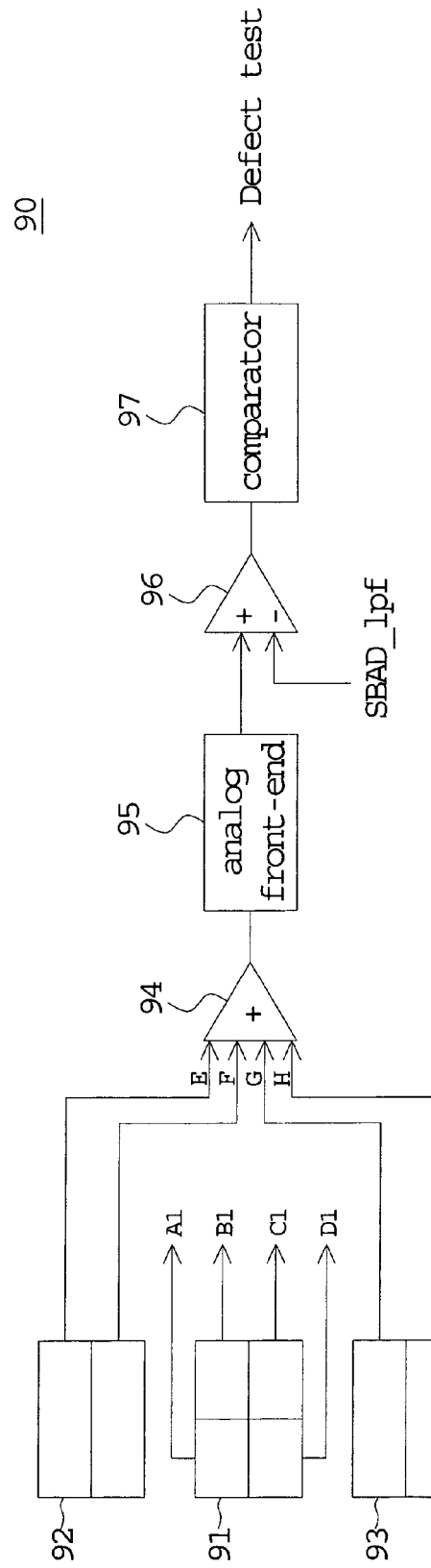
FIG. 2A is a partial circuit diagram of an optical disc drive according to a first embodiment of the invention.

Referring to FIG. 2A, a partial circuit diagram of an optical disc drive according to a first embodiment of the invention is shown. In FIG. 2A, the optical disc drive 90 at least comprises a main-photodetector 91, sub-photodetector 92 and 93, an adder 94, an analog front-end 95, a subtractor 96 and a comparator 97. The optical pick-up head (not shown in FIG. 2A) of the optical disc drive 90 would emit a Laser light having three or five beams onto the optical disc. Take the five-beam Laser light for example. The five beams comprise a main-beam and four sub-beams. The two sub-beams and another two sub-beams are symmetrically positioned at the two sides of the main-beam. The five beams are projected onto the optical disc on which a main spot and four sub spots are formed correspondingly. The main photodetector 91 receives the main-beam reflected via the optical disc and accordingly outputs four photodetecting signals A1, B1, C1 and D1.

The sub-photodetector 92 receives the two sub-beams reflected via the optical disc and accordingly outputs two photodetecting signals E and F. The sub-photodetector 93 receives another two sub-beams reflected via the optical disc and accordingly outputs two photodetecting signals G and H.

After being processed by the adder 94, the photodetecting signals E, F, G and H are transmitted to the analog front-end 95. The analog front-end 95 converts the photodetecting signals E, F, G and H into a sub-beam add signal (SBAD) according to the predetermined SBAD gain. The subtractor 96 performs SBAD low-pass filter (SBAD_lpf) processing on the SBAD signal to filter the noise and then the processed SBAD signals are outputted to the comparator 97. The comparator 97 has a defect threshold range. Each point of the SBAD signal has a corresponding SBAD value, and the comparator 97 determines whether a disc is defective according to whether each of the SBAD values falls within the defect threshold range. If the SBAD value falls outside the defect threshold range, the optical disc is determined to be a defective disc.

The optical disc drive 90 adopts "Mount Rainier" method to format and write an optical disc and N data packets are written onto the optical disc during N read status and N write status. The N read status include a first to an $N^{th}$ read status, the N write status include a first to an $N^{th}$ write status, and the N data packets include a first to an $N^{th}$ data packet. The optical disc drive 90 reads the optical disc at the $i^{th}$ read status and writes the $i^{th}$ data packet onto the optical disc at the $i^{th}$ write status, where i ranges from 1 to N. The optical disc drive 90 has a predetermined write SBAD gain. Besides, the optical disc drive 90 uses a reading power to read the optical disc during the N read status, while the optical disc drive 90 uses a writing power to write the N data packets onto the optical disc during the N write status. The reading power of the laser light is lower than the writing power of the laser light.

Figure 2B:
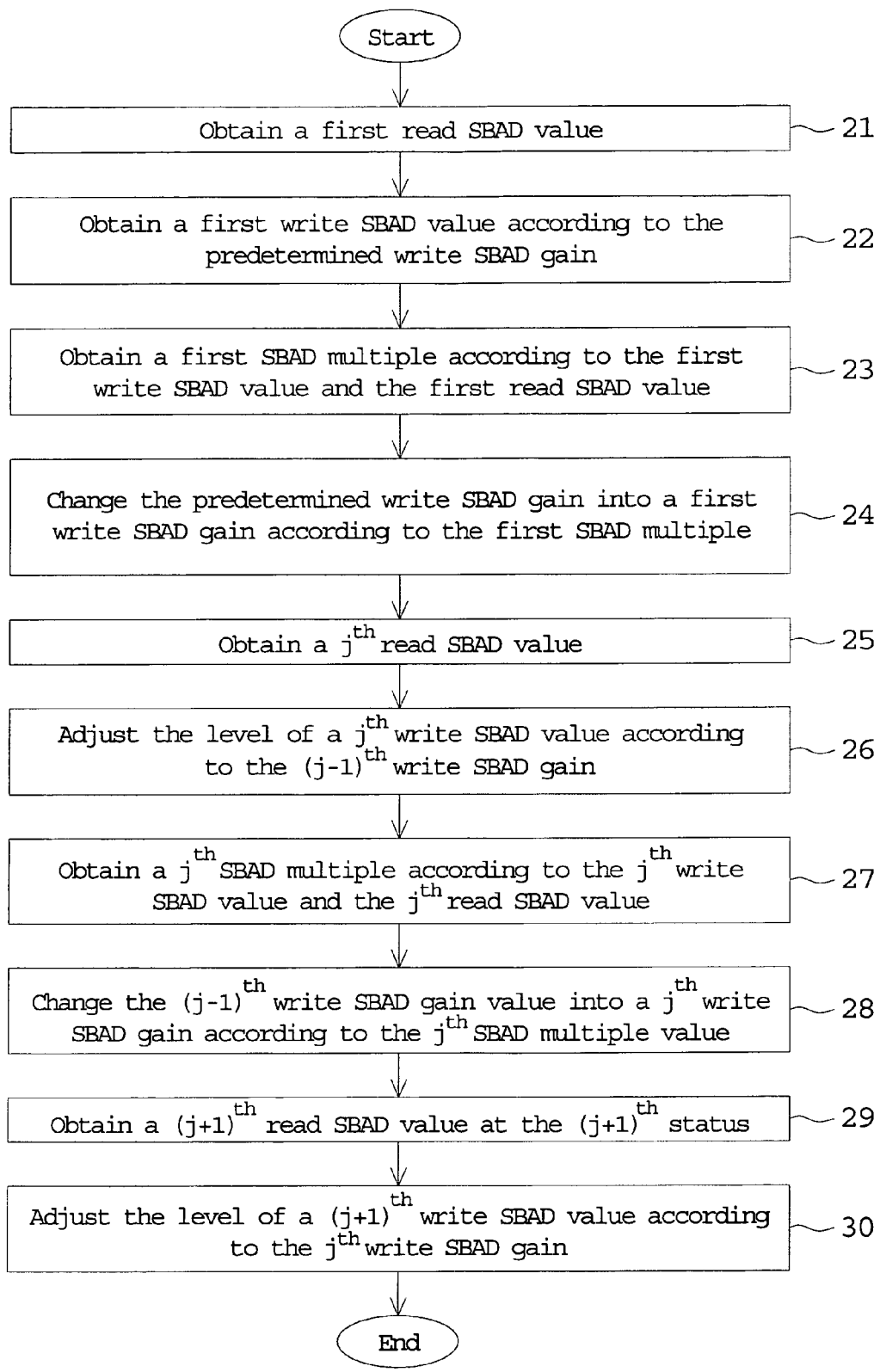
FIG. 2B is a flowchart of a method for determining an SBAD value according to a first embodiment of the invention.

Referring to FIG. 2B, a flowchart of a method for determining a SBAD value according to a first embodiment of the invention is shown. Refer to FIG. 2A at the same time. At first, in step 21, a first read SBAD is generated when an optical disc is read at the first read status, and a first read SBAD value is obtained by sampling the first read SBAD within a first duration, which is approximately 6~8 miniseconds (ms). Next, proceed to step 22, a first data packet is written onto the optical disc and a first write SBAD is generated according to a predetermined write SBAD gain stored in the analog front-end 95 of FIG. 2A at the first write status. A first write SBAD value is obtained by sampling the first write SBAD within a second duration which is approximately 6~8 ms. Then, in step 23, a first SBAD multiple is obtained according to the first write SBAD value and the first read SBAD value. Besides, the optical disc drive 90 has an SBAD reference value, and suppose the SBAD reference value, the first read SBAD value, the first write SBAD value and the first SBAD multiple are respectively equal to M, N1, X1 and Y1, the optical disc drive 90 will obtain an operation value (dB) of $Y1=20*\log[(X1-M)/(N1-M)]$.

Figure 3:
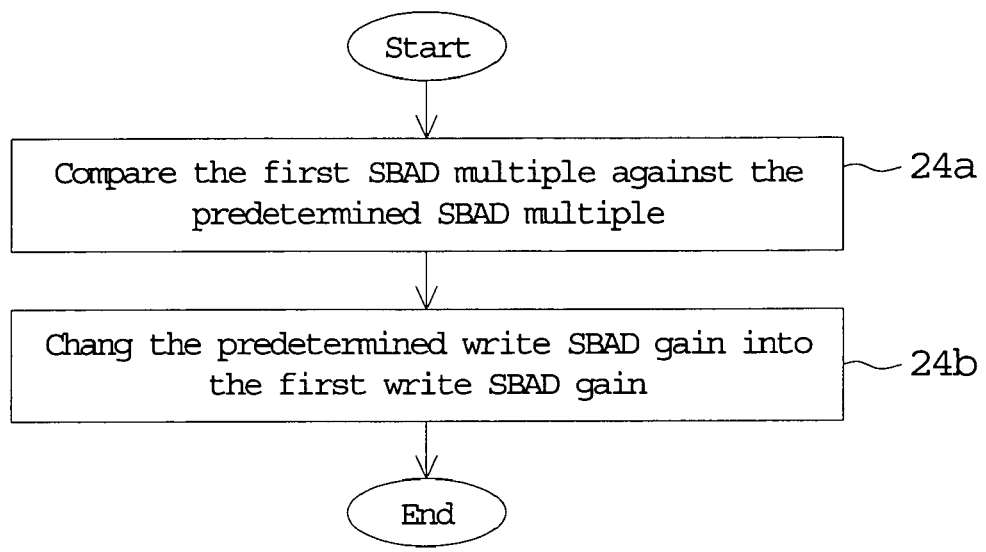
FIG. 3 is a flowchart of the step 24 of FIG. 2B.

Next, in step 24, the predetermined write SBAD gain of the analog front-end 95 is changed into a first write SBAD gain according to the first SBAD multiple. However, the conventional method only adjusts the write SBAD value at each write status according to the predetermined write SBAD gain (i.e., a constant) stored in the optical disc drive, and does not adjust the write SBAD gain according to the first SBAD multiple. In the present embodiment, the optical disc drive 90 has a predetermined SBAD multiple, so step 24 further comprises the following steps. As shown in FIG. 3, at first, in step 24a, the first SBAD multiple and the predetermined SBAD multiple are compared, and then a first write SBAD gain is obtained. Since the writing power is higher than the reading power, the SBAD value would upsurge, causing the first SBAD multiple obtained by the optical disc drive 90 through calculation to be higher than the predetermined SBAD multiple. Next, in step 24b, the predetermined write SBAD gain is changed into the first write SBAD gain according to the result of the comparison in step 24a, a difference between or a ratio of the first SBAD multiple and predetermined SBAD multiple for instance.

Referring to FIG. 2B, after the predetermined write SBAD gain of the analog front-end 95 is changed into the first write SBAD gain by the optical disc drive 90, in step 25, the optical disc is read and a $j^{th}$ read SBAD value is obtained at the $j^{th}$ read status read, wherein j ranges from 2 to N. Next, in step 26, the $j^{th}$ data packet is written onto the optical disc at the $j^{th}$ write status and the level of a $j^{th}$ write SBAD value is adjusted according to the $(j-1)^{th}$ write SBAD gain. So that, the difference between the level of the $j^{th}$ write SBAD value and that of the $(j+1)^{th}$ read SBAD value is reduced. Then, in step 27, a $j^{th}$ SBAD multiple is obtained according to the $j^{th}$ write SBAD value and the $j^{th}$ read SBAD value. Suppose the $j^{th}$ read SBAD value, the $j^{th}$ write SBAD value and the $j^{th}$ SBAD multiple are respectively equal to N2, X2 and Y2, the operation value (dB) is $Y2=20*\log[(X2-M)/(N2-M)]$.

Figure 4:
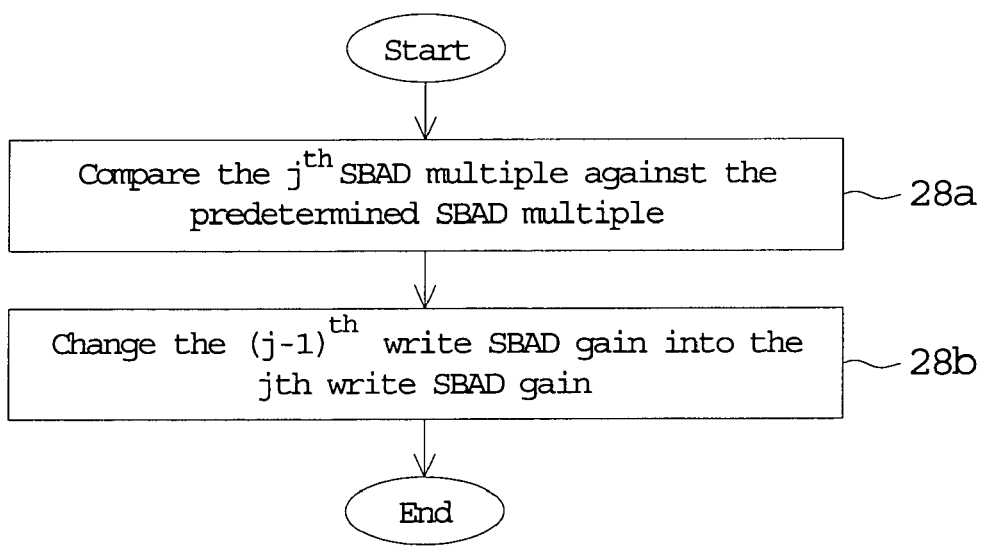
FIG. 4 is a flowchart of the step 28 of FIG. 2B.

Next, in step 28, the $(j-1)^{th}$ write SBAD gain of the analog front-end 95 is changed into a $j^{th}$ write SBAD gain according to the $j^{th}$ SBAD multiple. In the present embodiment, step 28 further comprises the following steps. As shown in FIG. 4, at first, in step 28a, the $j^{th}$ SBAD multiple and the predetermined SBAD multiple are compared, and then the $j^{th}$ write SBAD gain is obtained. Next, in step 28b, the $(j-1)^{th}$ write SBAD gain is changed into the $j^{th}$ write SBAD gain according to the result of comparison in step 28a, such as a difference between or a ratio of the $j^{th}$ SBAD multiple and the predetermined SBAD multiple for instance. Besides, the $j^{th}$ SBAD multiple is smaller than the $(j-1)^{th}$ SBAD multiple, so the SBAD multiple obtained in the present method would gradually converge to the predetermined SBAD multiple or even smaller than predetermined multiple.

Refer to FIG. 2B again, after the $(j-1)^{th}$ write SBAD gain is changed into a $j^{th}$ write SBAD gain by the optical disc drive 90, in step 29, the optical disc is read and a $(j+1)^{th}$ read SBAD value is obtained at the $(j+1)^{th}$ read status. Next, in step 30, the $(j+1)^{th}$ data packet is written onto the optical disc at the $(j+1)^{th}$ write status and the level of a $(j+1)^{th}$ write SBAD value is adjusted according to the $j^{th}$ write SBAD gain, so that the difference between the level of the $(j+1)^{th}$ write SBAD value and that of the $(j+1)^{th}$ read SBAD value is reduced. Steps 25~30 are repeated until the optical disc drive has completed the writing of the optical disc.

Besides, the $(j+1)^{th}$ read SBAD value and the $j^{th}$ read SBAD value are basically stable and can be regarded as the same, i.e., 1.7 voltages (V) for instance, while the SBAD reference value can be set to be 0.8 V for instance. Suppose the first write SBAD value is 2.3 V, a level which is far larger than the 1.7 V and would cause the optical disc drive 90 to mis-determine defects when the first read status is switched to the first write status. According to the present method, the $(j+1)^{th}$ write SBAD value is smaller than the $j^{th}$ write SBAD value, so the $(j+1)^{th}$ write SBAD value is closer to 1.7 V than the $j^{th}$ write SBAD value is, largely reducing the likelihood that the optical disc drive would mis-determine defects when the subsequent read status is switched to the write status.

Second Embodiment

Figure 5:
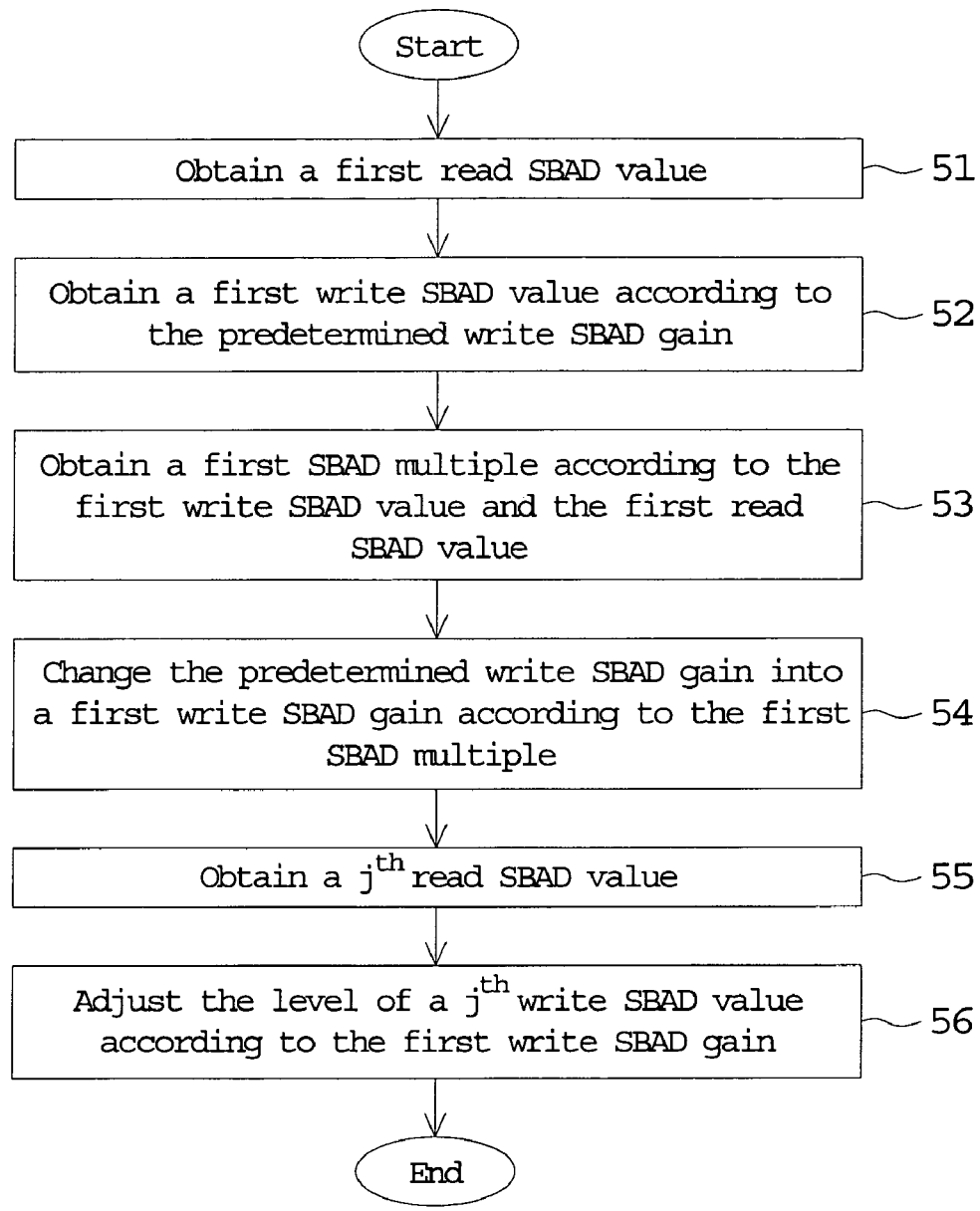
FIG. 5 is a flowchart of a method for determining an SBAD value according to a second embodiment of the invention.

Referring to FIG. 5, a flowchart of a method for determining an SBAD value according to a second embodiment of the invention is shown. Refer to FIG. 2A at the same time, at first, in step 51, the optical disc is read and a first read SBAD value is obtained at the first read status. Next, in step 52, the first data packet is written onto the optical disc at the first write status and a first write SBAD value is obtained according to predetermined write SBAD gain. Then, in step 53, a first SBAD multiple is obtained according to the first write SBAD value and the first read SBAD value. Besides, the optical disc drive 90 has an SBAD reference value. Suppose the SBAD reference value, the first read SBAD value, the first write SBAD value and the first SBAD multiple are respectively equal to M, N1, X1 and Y1, the operation value (dB) is Y1=20*log[(X1−M)/(N1−M)].

Next, in step 54, the predetermined write SBAD gain is changed into a first write SBAD gain according to the first SBAD multiple. In the present embodiment, the optical disc drive 90 has a predetermined SBAD multiple, and the step 54 further comprises the following steps. As shown in FIG. 3, at first, in step 24a, the first SBAD multiple and predetermined SBAD multiple are compared, and then the first write SBAD gain is obtained. Next, in step 24b, the predetermined write SBAD gain is changed into the first write SBAD gain according to the result of comparison in step 24a such as a difference between or a ratio of the first SBAD multiple and predetermined SBAD multiple.

Referring to FIG. 5, after the predetermined write SBAD gain is changed into the first write SBAD gain by the optical disc drive 90, in step 55, the optical disc is read and a $j^{th}$ read SBAD value is obtained at the $j^{th}$ read status, wherein j ranges from 2 to N. Next, in step 56, the $j^{th}$ data packet is written onto the optical disc at the $j^{th}$ write status and the level of a $j^{th}$ write SBAD value is adjusted according to the first write SBAD gain, so that the difference between the level of the $j^{th}$ write SBAD value and that of the $j^{th}$ read SBAD value is reduced. Steps 55~56 are repeated until the optical disc drive has completed the writing of the optical disc.

A method for determining a sub-beam add signal (SBAD) value is disclosed above. The method of the invention has the design of dynamically adjusting a write SBAD gain according to the difference between a write SBAD value and a read SBAD value effectively avoids an upsurge in the SBAD value when an optical disc drive is switched from a read status to a write status, thereby preventing errors in the detection of defects. Besides, the invention can have the design of an even stricter defect threshold range such as −50 mV~50 mV for instance to effectively detect fingerprints.

When the optical disc drive adopts sequential write method (i.e., when writing a Mount Rainier format disc), the steps of the invention are disclosed below. At first, a write SBAD value and a read SBAD value are calculated. Then, an SBAD gain is determined according to the write SBAD value and the read SBAD value and the SBAD gain is used to adjust the level of the write SBAD value for next writing so as to reduce the difference between the level of the write SBAD value and the read SBAD value. When the read status and the write status are continually alternated, the SBAD level is dynamically adjusted to avoid erroneous detection of defects.

Another advantage of the invention is the design of an even narrower defect threshold range, such as −100 mV~100 mV, whereby the defects can be more effectively and correctly detected.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for determining a sub-beam add signal (SBAD) value applied in an optical disc drive when N data packets are written onto a disc during N read status and N write status, wherein the N read status include a first to an $N^{th}$ read status, the N write status include a first to an $N^{th}$ write status, the N data packets include a first to an $N^{th}$ data packet, the optical disc drive reads the optical disc at the $i^{th}$ read status and writes the $i^{th}$ data packet onto the optical disc at the $i^{th}$ write status where i ranges from 1 to N, the optical disc drive has a predetermined write SBAD gain, and the method comprises:

reading the optical disc and obtaining a first read SBAD value at the first read status;

writing the first data packet onto the optical disc at the first write status and obtaining a first write SBAD value according to the predetermined write SBAD gain;

obtaining a first SBAD multiple according to the first write SBAD value and the first read SBAD value;

changing the predetermined write SBAD gain into a first write SBAD gain according to the first SBAD multiple;

reading the optical disc and obtaining a $j^{th}$ read SBAD value at the $j^{th}$ read status, wherein j ranges from 2 to N−1;

writing the $j^{th}$ data packet onto the optical disc at the $j^{th}$ write status and adjusting the level of a $j^{th}$ write SBAD value according to the $(j-1)^{th}$ write SBAD gain;

obtaining a $j^{th}$ SBAD multiple according to the $j^{th}$ write SBAD value and the $j^{th}$ read SBAD value;

changing the $(j-1)^{th}$ write SBAD gain into a $j^{th}$ write SBAD gain according to the $j^{th}$ SBAD multiple;

reading the optical disc and obtaining a $(j+1)^{th}$ read SBAD value at the $(j+1)^{th}$ status; and writing the $(j+1)^{th}$ data packet onto the optical disc at the $(j+1)^{th}$ write status and adjusting the level of a $(j+1)^{th}$ write SBAD value according to the $j^{th}$ write SBAD gain.

2. The method according to claim 1, the optical disc drive having an SBAD reference value, wherein the SBAD reference value, the first read SBAD value, the first write SBAD value and the first SBAD multiple are respectively equal to M, N1, X1 and Y1, the operation value (dB) is Y1=20*log[(X1−M)/(N1−M)].

3. The method according to claim 2, the optical disc drive having a predetermined SBAD multiple, wherein the step of changing the predetermined write SBAD gain into the first write SBAD gain according to the first SBAD multiple further comprises:

comparing the first SBAD multiple against the predetermined SBAD multiple to obtain the first write SBAD gain; and changing the predetermined write SBAD gain into the first write SBAD gain.

4. The method according to claim 1, the optical disc drive having an SBAD reference value, wherein the SBAD reference value, the $j^{th}$ read SBAD value, the $j^{th}$ write SBAD value and the $j^{th}$ SBAD multiple are respectively equal to M, N2, X2 and Y2, the operation value (dB) is Y2=20*log[(X2−M)/(N2−M)].

5. The method according to claim 4, the optical disc drive having a predetermined SBAD multiple, wherein the step of changing the $(j-1)^{th}$ write SBAD gain into the $j^{th}$ write SBAD gain according to the $j^{th}$ SBAD multiple further comprises:

comparing the $j^{th}$ SBAD multiple against the predetermined SBAD multiple to obtain the $j^{th}$ write SBAD gain; and changing the $(j-1)^{th}$ write SBAD gain into the $j^{th}$ write SBAD gain.

6. The method according to claim 4, wherein the $j^{th}$ SBAD multiple is smaller than the $(j-1)^{th}$ SBAD multiple.

7. The method according to claim 1, wherein the optical disc drive uses a reading power to read the optical disc at the N read status, the optical disc drive uses a writeing power to write the N data packets onto the optical disc at the N write status, and the reading power of the laser light is lower than the writing power of the laser light.

8. A method for determining a sub-beam add signal (SBAD) value applied in an optical disc drive, wherein the optical disc drive adopts a sequential write method to dynamically adjust the SBAD level to avoid errors in detecting defects, the method comprises:
 calculating a write SBAD value and a read SBAD value of the optical disc drive; and
 determining an SBAD gain according to the write SBAD value and the read SBAD value, wherein the SBAD gain is for calibrating the level of the next write SBAD value.

9. A method for determining a sub-beam add signal (SBAD) value applied in an optical disc drive when N data packets written onto a disc during N read status and N write status, wherein the N read status include a first to an $N^{th}$ read status, the N write status include a first to an $N^{th}$ write status, the N data packets include a first to an $N^{th}$ data packet, the optical disc writer reads the optical disc at the $i^{th}$ read status and writes the $i^{th}$ data packet onto the optical disc at the $i^{th}$ write status where i ranges from 1 to N, the optical disc drive has a predetermined write SBAD gain, and the method comprises:
 reading the optical disc and obtaining a first read SBAD value at the first read status;
 writing the first data packet onto the optical disc and obtaining a first write SBAD value at the first write status according to the predetermined write SBAD gain;
 obtaining a first SBAD multiple according to the first write SBAD value and the first read SBAD value;
 changing the predetermined write SBAD gain into a first write SBAD gain according to the first SBAD multiple;
 reading status read the optical disc and obtaining a $j^{th}$ read SBAD value at the $j^{th}$, wherein j ranges from 2 to N−1; and
 writing the $j^{th}$ data packet onto the optical disc at the $j^{th}$ write status and adjusting the level of a $j^{th}$ write SBAD value according to the first write SBAD gain.

10. The method according to claim 9, the optical disc drive having an SBAD reference value, wherein the SBAD reference value, the first read SBAD value, the first write SBAD value and the first SBAD multiple are respectively equal to M, N1, X1 and Y1, the operation value (dB) is $Y1=20*\log[(X1-M)/(N1-M)]$.

11. The method according to claim 10, the optical disc drive having a predetermined SBAD multiple, wherein the step of changing the predetermined write SBAD gain into the first write SBAD gain according to the first SBAD multiple further comprises:
 comparing the first SBAD multiple against the predetermined SBAD multiple to obtain the first write SBAD gain; and
 changing the predetermined write SBAD gain into the first write SBAD gain.

12. The method according to claim 9, wherein the optical disc drive uses a reading power to read the optical disc when at the N read status, the optical disc drive uses a writing power light to have the N data packets written onto the optical disc when at the N write status, and the reading power of the laser light is lower than the writing power.

* * * * *